United States Patent
Blizzard

(10) Patent No.: US 12,448,760 B2
(45) Date of Patent: Oct. 21, 2025

(54) ELECTRONIC FAUCET WITH MOTION CONTROL DEVICE

(71) Applicant: ASSA ABLOY Americas Residential Inc., New Haven, CT (US)

(72) Inventor: Stephen Blizzard, Mission Viejo, CA (US)

(73) Assignee: ASSA ABLOY Americas Residential Inc., New Haven, CT (US)

( * ) Notice: Subject to any disclaimer, the term of this patent is extended or adjusted under 35 U.S.C. 154(b) by 387 days.

(21) Appl. No.: 17/715,307

(22) Filed: Apr. 7, 2022

(65) Prior Publication Data

US 2022/0325509 A1 Oct. 13, 2022

Related U.S. Application Data

(60) Provisional application No. 63/171,833, filed on Apr. 7, 2021.

(51) Int. Cl.
*E03C 1/05* (2006.01)
*G06F 3/01* (2006.01)

(52) U.S. Cl.
CPC .............. *E03C 1/057* (2013.01); *G06F 3/017* (2013.01); *Y10T 137/9464* (2015.04)

(58) Field of Classification Search
CPC .......... E03C 1/055; E03C 1/057; G06F 3/017; G06F 3/04883; Y10T 137/9464
USPC ...................................................... 137/801
See application file for complete search history.

(56) References Cited

U.S. PATENT DOCUMENTS

| | | | |
|---|---|---|---|
| 6,962,168 B2 | 11/2005 | McDaniel et al. | |
| 7,150,293 B2 | 12/2006 | Jonte | |
| 7,232,111 B2 | 6/2007 | McDaniel et al. | |
| 7,537,023 B2 | 5/2009 | Marty et al. | |
| 7,627,909 B2* | 12/2009 | Esche | E03C 1/057 251/263 |
| 7,690,395 B2 | 4/2010 | Jonte et al. | |
| 8,127,782 B2 | 3/2012 | Jonte et al. | |
| 8,528,579 B2 | 9/2013 | Jonte et al. | |
| 8,561,626 B2 | 10/2013 | Sawaski et al. | |
| 8,776,817 B2 | 7/2014 | Sawaski et al. | |
| 8,844,564 B2 | 9/2014 | Jonte et al. | |
| 8,944,105 B2* | 2/2015 | Rodenbeck | E03C 1/057 137/801 |
| 8,973,612 B2 | 3/2015 | Sawaski et al. | |
| 9,057,182 B1* | 6/2015 | Friedman | E03C 1/18 |
| 9,228,329 B2 | 1/2016 | Rodenbeck et al. | |

(Continued)

FOREIGN PATENT DOCUMENTS

| | | |
|---|---|---|
| CA | 2492226 A1 | 7/2005 |
| CN | 102844501 B | 12/2012 |
| WO | 2022072759 A1 | 7/2022 |

*Primary Examiner* — Daphne M Barry
(74) *Attorney, Agent, or Firm* — Merchant & Gould P.C.

(57) ABSTRACT

A faucet is provided that electronically controls the flow of water being dispensed using a sensor assembly. The faucet includes an electronic flow control assembly includes a water inlet and a water outlet in fluid communication with a spout of the faucet, and an electronic valve assembly is configured to control a water flow being dispensed through the spout. The sensor assembly includes at least one optical sensor configured to detect a gesture, and a controller is configured to receive the gesture from the sensor assembly to adjust the water flow based on the gesture.

20 Claims, 8 Drawing Sheets

(56) References Cited

U.S. PATENT DOCUMENTS

| | | | |
|---|---|---|---|
| 9,243,391 B2 | 1/2016 | Jonte et al. | |
| 9,394,675 B2 | 7/2016 | Sawaski et al. | |
| D808,501 S | 1/2018 | Potter | |
| 9,856,634 B2 | 1/2018 | Rodenbeck et al. | |
| D816,806 S | 5/2018 | Potter | |
| 10,208,465 B2 * | 2/2019 | Martin | F16K 31/0675 |
| 10,349,787 B2 * | 7/2019 | Burgo, Sr | A47K 5/1202 |
| 10,458,642 B2 * | 10/2019 | Heuer | F21S 10/02 |
| 10,557,254 B2 * | 2/2020 | Song | E03C 1/057 |
| 10,648,163 B2 | 5/2020 | Blake et al. | |
| 10,767,354 B2 * | 9/2020 | Tracy | E03C 1/057 |
| 11,161,730 B1 * | 11/2021 | Volftsun | B67D 1/0007 |
| 11,781,298 B2 * | 10/2023 | Obrist | G06T 7/70 |
| | | | 4/623 |
| 11,852,963 B2 * | 12/2023 | Peel | H05B 47/115 |
| 11,859,375 B2 * | 1/2024 | Loeck | E03C 1/057 |
| 2006/0200903 A1 * | 9/2006 | Rodenbeck | G01S 17/04 |
| | | | 4/623 |
| 2007/0057215 A1 * | 3/2007 | Parsons | E03D 3/02 |
| | | | 251/129.04 |
| 2007/0069168 A1 | 3/2007 | Jonte | |
| 2007/0246550 A1 * | 10/2007 | Rodenbeck | G05D 23/1393 |
| | | | 236/12.11 |
| 2008/0271238 A1 * | 11/2008 | Reeder | A61B 5/0871 |
| | | | 4/597 |
| 2010/0148971 A1 * | 6/2010 | Wawrla | E03C 1/057 |
| | | | 340/573.1 |
| 2012/0017367 A1 * | 1/2012 | Reeder | E03C 1/057 |
| | | | 4/597 |
| 2012/0273703 A1 | 11/2012 | Hsu et al. | |
| 2017/0254055 A1 * | 9/2017 | Xia | E03B 1/042 |
| 2021/0335358 A1 * | 10/2021 | Beck | E03C 1/057 |
| 2021/0343281 A1 | 11/2021 | Beck et al. | |

* cited by examiner

ELECTRONIC FAUCET WITH MOTION CONTROL DEVICE

CROSS-REFERENCE TO RELATED APPLICATIONS

The present application claims priority from U.S. Provisional Patent Application No. 63/171,833, filed on Apr. 7, 2021, the disclosure of which is hereby incorporated by reference in its entirety.

TECHNICAL FIELD

The present disclosure relates generally to faucets. In particular, the present disclosure relates to a faucet that is electronically controlled, for example, based on the spatial orientation of a user's hand.

BACKGROUND

Faucets typically comprise mechanical parts to control the temperature and flow of water. In many situations, a mechanical valve controls the hot and cold water inlets through one or more faucet handles. Typically, a user manipulates the mechanical handle to adjust hot/cold mix and water flow. Attempts have been made to slim down the faucet body to create a more aesthetically pleasing design, for example, by removing the handle.

Faucets without a handle may be controlled by sensors or other means, such as voice control. Faucets with a sensor include the ability to sense motion, which is used to turn the faucet on or off. Generally, these faucets sense movement in one or two dimensions (e.g., vertical and lateral horizontal movement in front of a motion sensor). Further, these faucets are only configured to control the water flow rate, for example, turning the water on or turning the water off.

SUMMARY

According to the present disclosure, a faucet as described includes a sensor assembly comprising at least one optical sensor that is configured to detect a hand gesture, which is used to control a water flow.

According to a first aspect, a faucet includes a faucet body, an electronic flow control assembly, a sensor assembly, and a controller. The faucet comprises a spout, which is capable of dispensing water. The electronic flow control assembly includes a water inlet and a water outlet in fluid communication with the spout. The electronic valve assembly is configured to control a water flow being dispensed through the spout. The sensor assembly comprises at least one optical sensor configured to detect a gesture within a three-dimensional space proximate to the sensor assembly. The controller is electronically coupled to the sensor assembly and the electronic flow control assembly. The controller is configured to receive the gesture from the sensor assembly and adjust the water flow based on the gesture received.

In another aspect, a method of controlling a water flow dispensed from a faucet is described. The method includes the following steps. A gesture is detected via a sensor assembly comprising at least one optical sensor. The gesture is within a three-dimensional space proximate to the sensor assembly. The gesture is sent to a controller that is electronically coupled to the sensor assembly and an electronic flow control assembly. The controller is configured to adjust the water flow based on the gesture received. The water flow is adjusted through a faucet and is controlled by the electronic flow control assembly, without manual adjustment of a handle of the faucet.

In yet another aspect, an electronic flow control device is described. The electronic flow control device includes an electronic flow control assembly, a sensor assembly, and a controller. The electronic flow control assembly comprises a fluid inlet and a fluid outlet, and is configured to control a water flow being dispensed through a faucet spout. The sensor assembly comprises at least one optical sensor configured to detect a gesture within a three-dimensional space proximate to the sensor assembly. The controller is electronically coupled to the sensor assembly and the electronic flow control assembly. The controller is configured to receive the gesture from the sensor assembly and adjust the water flow based on the gesture received.

Additional features of the present disclosure will become apparent to those skilled in the art upon consideration of illustrative embodiments including the best mode of carrying out the disclosure as presently perceived.

BRIEF DESCRIPTION OF THE FIGURES

The following drawings are illustrative of particular embodiments of the present disclosure and therefore do not limit the scope of the present disclosure. The drawings are not to scale and are intended for use in conjunction with the explanations in the following detailed description. Embodiments of the present disclosure will hereinafter be described in conjunction with the appended drawings, wherein like numerals denote like elements.

DETAILED DESCRIPTION

Figure 1:
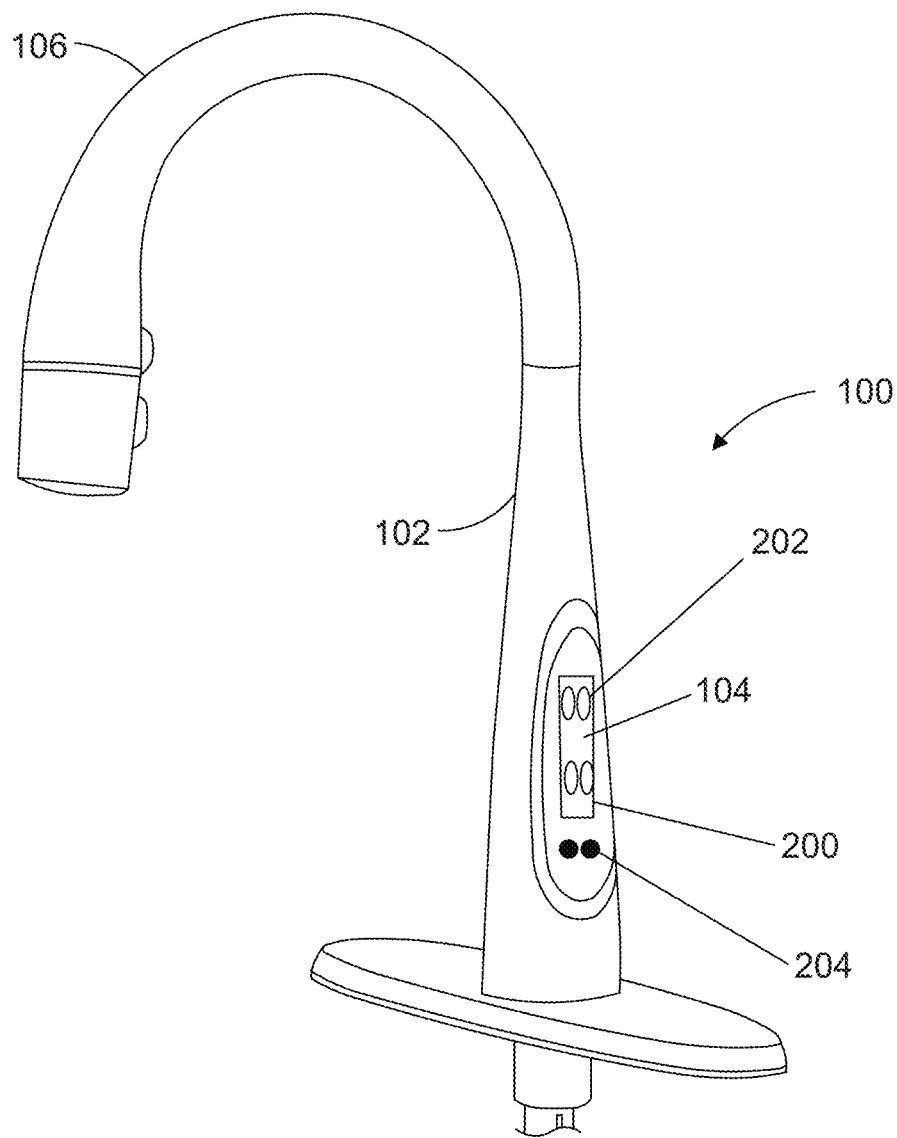
FIG. 1 is a perspective view of an example faucet according to an embodiment of the disclosure.

The figures and descriptions provided herein may have been simplified to illustrate aspects that are relevant for a clear understanding of the herein described devices, systems, and methods, while eliminating, for the purpose of clarity, other aspects that may be found in typical devices, systems, and methods. Those of ordinary skill may recognize that other elements and/or operations may be desirable and/or necessary to implement the devices, systems, and methods described herein. Because such elements and operations are well known in the art, and because they do not facilitate a better understanding of the present disclosure, a discussion of such elements and operations may not be provided herein. However, the present disclosure is deemed to inherently include all such elements, variations, and modifications to the described aspects that would be known to those of ordinary skill in the art.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. Additionally, it should be appreciated that items included in a list in the form of "at least one A, B, and C" can mean (A); (B); (C); (A and B); (A and C); (B and C); or (A, B, and C). Similarly, items listed in the form of "at least one of A, B, or C" can mean (A); (B); (C); (A and B); (A and C); (B and C); or (A, B, and C).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

FIG. 1 is a perspective view of an example gesture-controlled faucet 100 according to an embodiment of the disclosure. In the example shown, the faucet 100 includes a faucet body 102, a spray head 106, and a user interface 104. In an embodiment, the spray head 106 can be detached or undocked from the faucet body 102. Although the faucet 100 is shown as a pull-down kitchen faucet for purposes of example, this disclosure encompasses other types of faucets, including but not limited to, pull-out faucets, or faucets without a pull-out feature. Although this disclosure will be discussed with regard to a kitchen faucet for purposes of example, the control system described herein could be implemented in any type of faucet, including bathroom faucets, whether the faucet has a single handle or no handle. Still further, the control system may be integrated into an existing faucet, including kitchen faucets and bathroom faucets with a mechanical handle.

In some embodiments, like the example shown in FIG. 1, the faucet 100 does not include a faucet handle because it is otherwise controlled, for example, via hand gestures. However, in other embodiments, a handle (not shown) can be used to manually control a water flow in conjunction with user gestures.

Gestures, in the context of the present disclosure, can include any of a variety of types of user actions in space (typically, manual actions not in direct contact with the faucet but instead within a three dimensional gesture area proximate to the faucet and/or associated sensor.) As discussed herein, the gestures may be associated with actions by the faucet, such as dispensing liquid at a predetermined temperature or within a particular temperature range and relative volume or flow rate.

The faucet body 102, as shown, extends upwards from a deck, curves, and extends to face back toward the deck. However, the faucet body 102 can be shaped differently to provide a different connection with a faucet handle (not shown) or spray head 106. In the embodiment shown, the user interface 104 is integrated into the faucet body 102 to provide a streamlined appearance. The user interface 104 may be located on a side of the faucet body 102 or on front of the faucet body 102. In another embodiment, the user interface 104 does not need to be connected directly to the faucet body 102, but could be remote from the faucet body 102, such as located on a sink deck.

The user interface 104 includes a sensor assembly 200, and optionally, a status indicator 204, such as a light source. The sensor assembly 200 includes at least one optical sensor 202 that is configured to detect gestures, such as hand gestures, which is described in more detail below.

In an example embodiment, the user interface 104 includes a status indicator 204. The status indicator 204 may include an LED light that illuminates to communicate messages to a user. Numerous icons may be illuminated on the status indicator 204. In some embodiments (e.g., when the faucet 100 receives a command), an LED may be illuminated on the interface 104 and light may show through the faucet body 102 (e.g., in the shape of an icon), like a one-way screen. For example, a snowflake icon may be displayed when cold water is being dispensed, and a flame icon is displayed when hot water is being dispensed. Further icons may include a single water droplet for a slow flow of water, while multiple water droplets indicate a fast flow of water.

Figure 2:
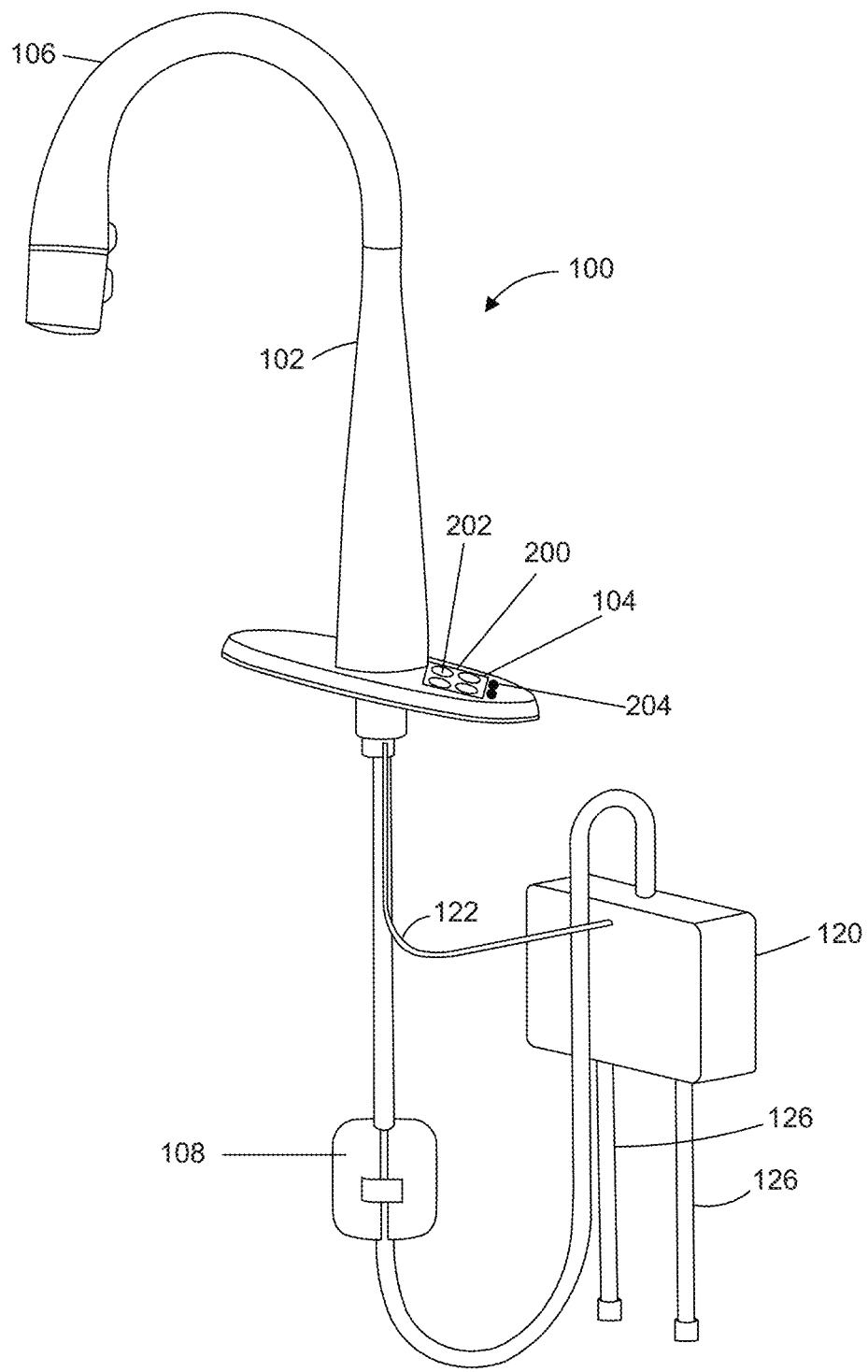
FIG. 2 illustrates a perspective view of an example faucet according to an embodiment of the disclosure.

FIG. 2 is another perspective view of a kitchen faucet according to an embodiment of the disclosure. In the example shown, the faucet 100 includes a faucet body 102 and a spray head 106 that can be detached or undocked from the faucet body 102. The user interface 104 may be mounted on a sink deck as shown, or alternatively, the user interface 104 may be substantially or fully integrated into the faucet body 102. The user interface 104 detects motion, such as hand gestures, and send signals to a controller 108 to control water flow using a flow control box 120, for example, through signal wires 122. The user interface 104 may be coupled to the signal wire 122 that in turn may be coupled to the controller 108 or other control circuitry.

The flow control box 120 can mix water from water supply inlet hoses 126 to provide a water flow of a user-selected temperature to be released from the spray head 106. The flow control box 120 can also select different types of water, i.e., filtered or unfiltered water, to be released from the spray head 106. The flow control box 120 as shown is located under the countertop of the faucet 100. The flow control box 120 can be located elsewhere as appropriate to receive signals from the controller 108 through signal wires 122 and provide water to be released from the spray head 106. The flow control box 120 can be located in a different position to provide more space underneath the countertop of the faucet 100 depending on the circumstances.

In the example shown, the controller 108 is located outside of the flow control box 120. In another embodiment, the controller 108 can also be located inside of the flow control box 120. In another embodiment, the controller 108 can be located above the countertop of the faucet 100. The controller 108 could also be located inside the user interface 104.

The connection between the user interface 104, the controller 108, and the flow control box 120 is shown as a wired connection through signal wires 122. In another embodiment, the communication between the user interface 104, the controller 108, and/or the flow control box 120 can be done wirelessly.

Figure 3:
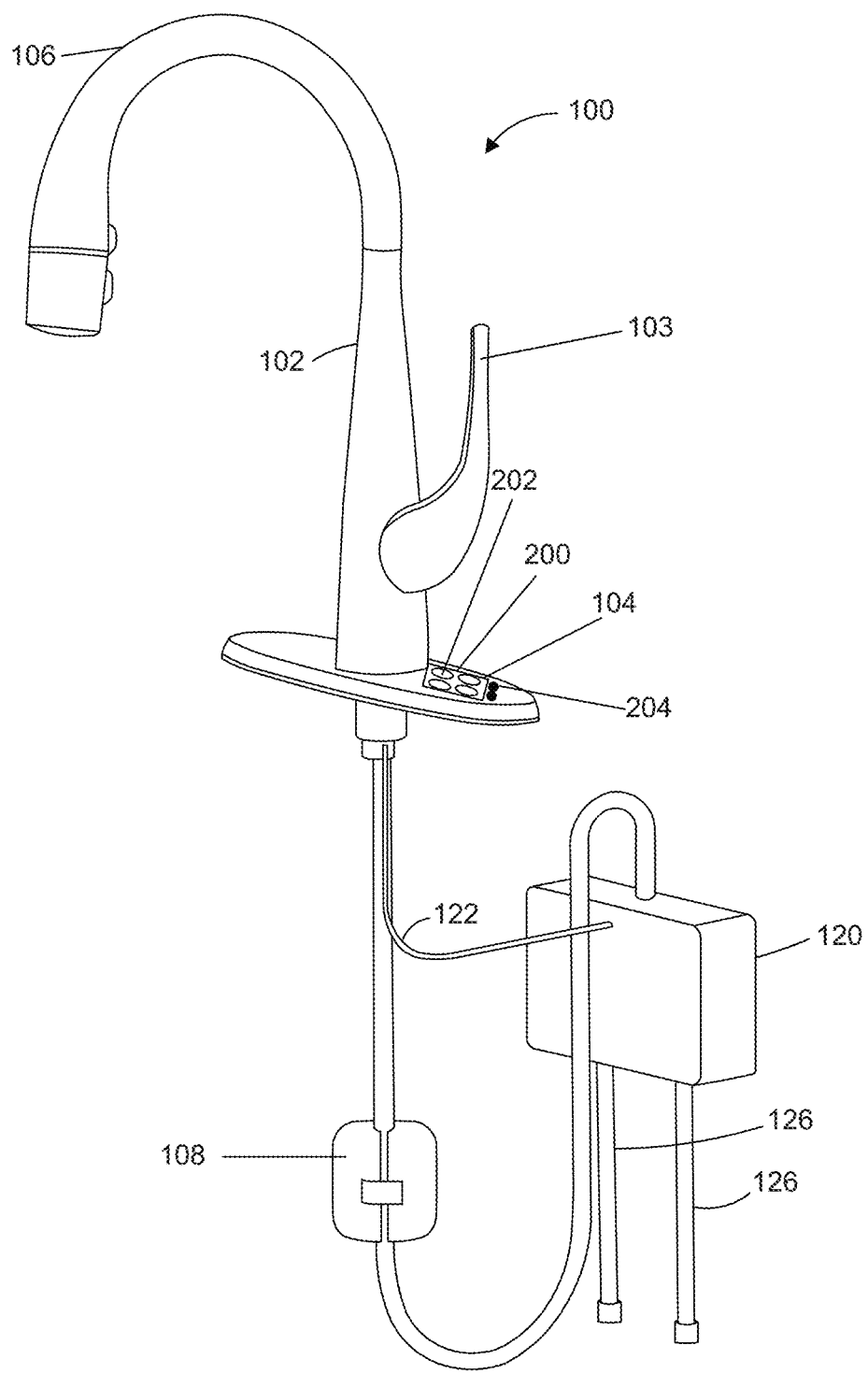
FIG. 3 illustrates a perspective view of an example faucet according to another embodiment of the disclosure.

FIG. 3 is another perspective view of a kitchen faucet. In the example shown, the faucet 100 includes a faucet body 102, a spray head 106 that can be detached or undocked from the faucet body 102, and a handle 103 that can manually control the water flow through the spout based on user-actuated movement. In an embodiment, the handle 103 can control the flow of water and/or the temperature of the water flowing. In a further embodiment, the handle 103 works in conjunction with the sensor assembly 200. For example, a user may turn on the water flow through the use of the handle 103 and then turn the flow of water off through the use of the sensor assembly 200. In another embodiment, the handle 103 and the sensor assembly 200 control different things. For example, the handle 103 may control the water flow, while the sensor assembly 200 controls the temperature of the water.

Figure 4:
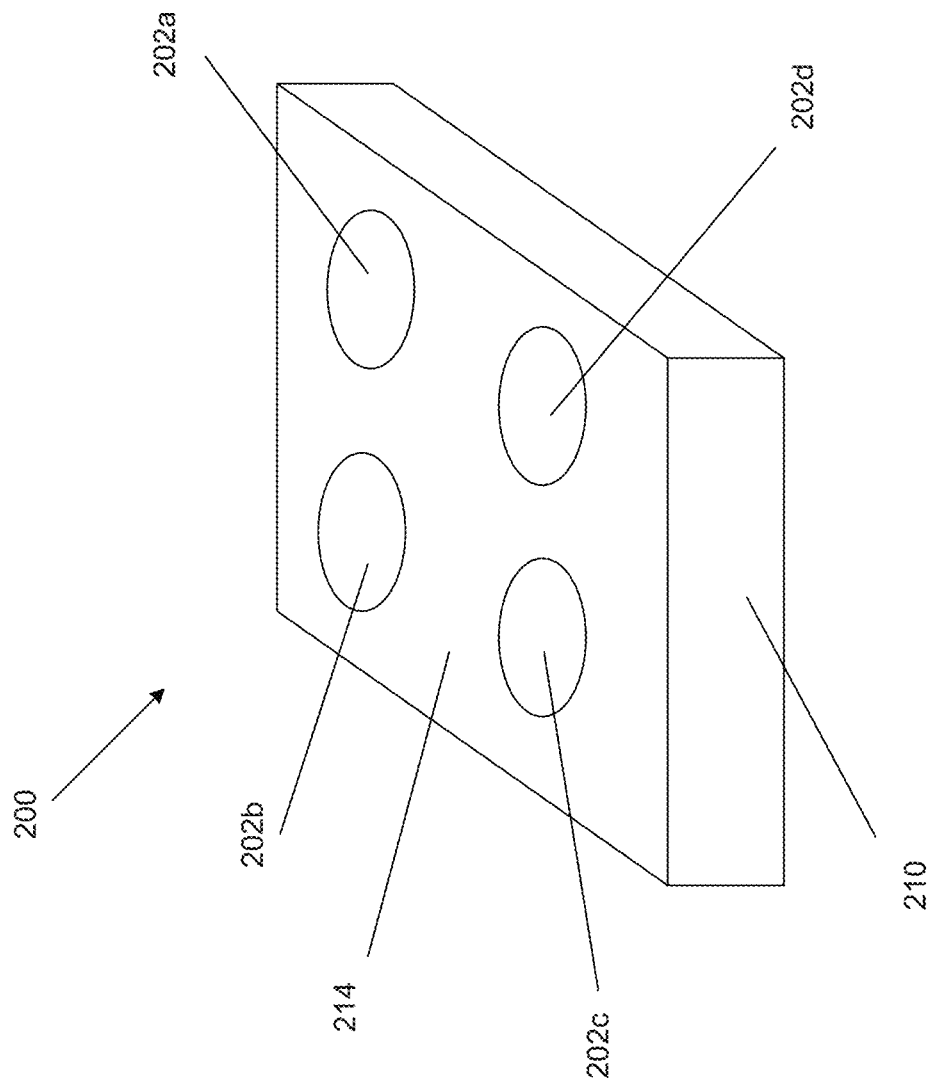
FIG. 4 illustrates an example embodiment of the sensor assembly.

FIG. 4 illustrates an example embodiment of the sensor assembly 200. The sensor assembly 200 includes a housing lid 214, a housing base 210, and at least one optical sensor 202.

In the example shown, four optical sensors 202a, 202b, 202c, 202d are present, each optical sensor 202a, 202b, 202c, 202d is spaced equidistantly from each other. Although the sensor assembly 200 as shown is rectangular (or square in shape), different shaped sensor assemblies 200 may be used. The shape of the sensor assembly 200 may be dependent on where the sensor assembly 200 is located.

The sensor assembly 200 as shown includes a plurality of optical sensors 202a, 202b, 202c, 202d, which are used to detect and differentiate gestures in three-dimensions. Each optical sensor 202a, 202b, 202c, 202d is configured to read the height of an object in its field of view, as well as the movement of the object and the speed of the movement. As described herein, the object is a user's hand, wherein the user is making a gesture. A difference between readings of the individual optical sensor 202 is used to determine movement and/or speed of the hand gesture.

The user interface 104 may be integrated into the faucet body 102 as shown in FIG. 1. However, the user interface 104 may be mounted away from the faucet 100, such as mounted on a faucet base or a sink deck. In an embodiment where the user interface 104 is not integrated into the faucet body 102, the user interface 104 may be connected to a controller 108 and an electronic flow control box 120 via signal wires 122 or the user interface 104 and circuit may include networking capabilities (e.g., Bluetooth, WiFi, mesh networking, Zigbee, etc.).

Figure 5:
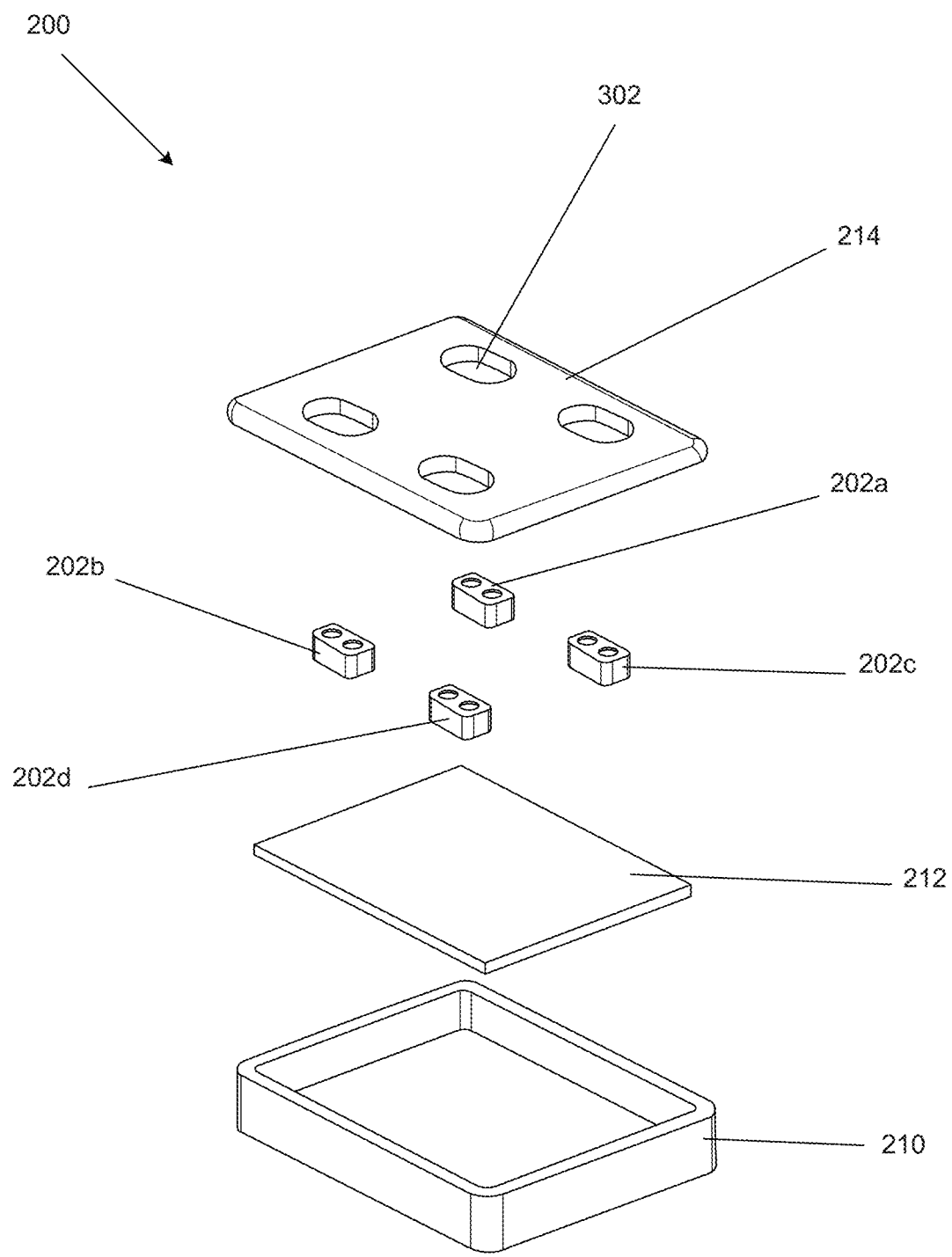
FIG. 5 illustrates an exploded view of a sensor assembly.

FIG. 5 illustrates an exploded view of the sensor assembly 200. The housing lid 214 includes one sensor window 302 for each optical sensor 202. The optical sensors 202a, 202b, 202c, 202d are positioned under the housing lid 214 at the sensor window 302. The optical sensors 202a, 202b, 202c, 202d are in communication with a printed circuit board 212. The optical sensors 202a, 202b, 202c, 202d and printed circuit board 212 are housed within the housing base 210.

As described above, the sensor assembly 200 is sized and shaped for the location to be placed. In a first example, the sensor assembly 200 is integrated within the faucet body and is designed to match the aesthetics of the faucet. In another example, the sensor assembly 200 is integrated within a faucet deck. In yet another example, the sensor assembly 200 is a standalone unit, and is optionally designed to fit within the space.

Figure 6:
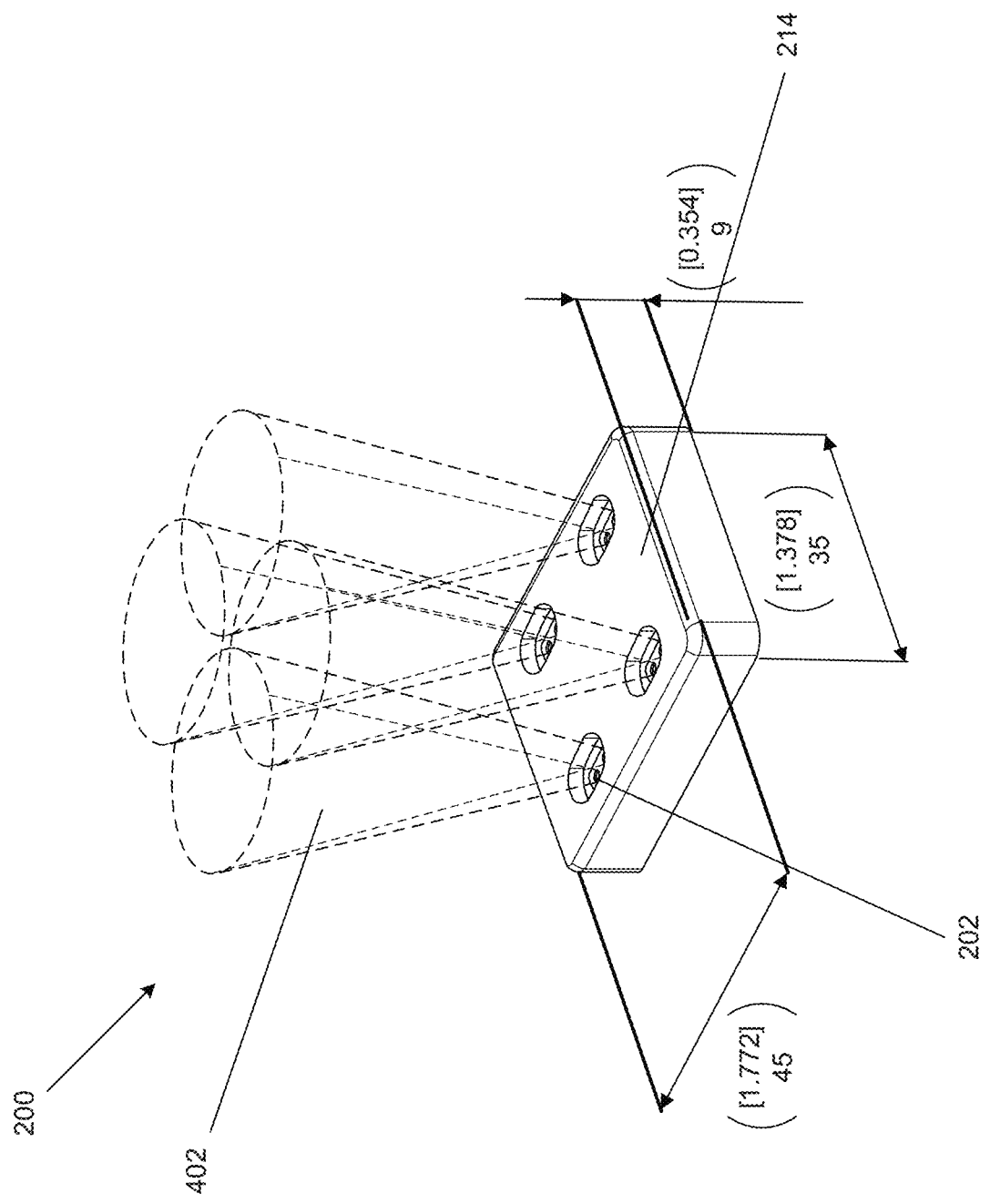
FIG. 6 illustrates a representative field of view of the sensor assembly.

FIG. 6 illustrates a representative field of view of the sensor assembly 200. Each optical sensor 202 includes its own field of view 402 (which is only shown for reference and not actually visible). Each optical sensor 202 reads a height of the gesture in its field of view 402. Each of the readings from each optical sensor 202 is sent to a controller (not shown) for processing. The circuit board 212 uses the difference between sensor readings to determine the movement of the gesture. The sensor assembly 200 is also capable of determining a speed of the hand gesture.

In an example embodiment of a standalone sensor assembly 200, the sensor assembly 200 has a width of about 35 mm, a length of about 45 mm, and a height of about 9 mm.

Each optical sensor 202 has a field of view 402 to detect a gesture at a predetermined distance from the housing lid 214. For example, in some embodiments, each optical sensor 202 may have a field of view from about 2 cm to about 30 cm, or up to 50 cm from the housing lid 214. Further, the diameter of the field of view 402 is about 2-5 cm at the housing lid 214 to about 20-40 cm at the height of the field of view 402. Other ranges may be possible as well.

Figure 7:
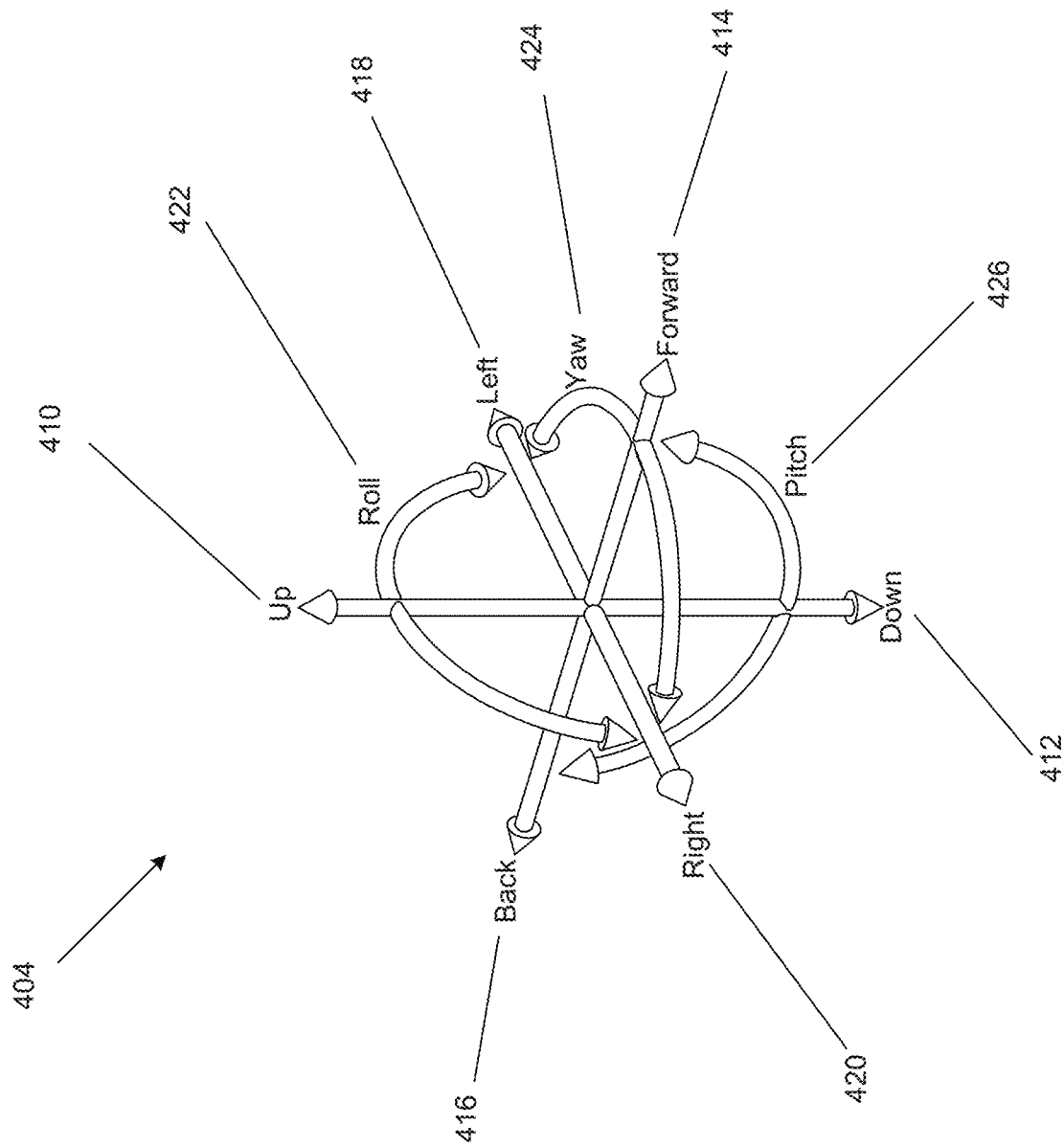
FIG. 7 illustrates an example spatial orientation of possible gestures.

FIG. 7 illustrates an example spatial orientation map 404 of possible gestures. The spatial orientation map 404 senses six degrees of movement, which allows for multiple simple hand gestures to control features of the faucet 100. The spatial orientation map 404 includes the following different opposing movements: up 410 and down 412, forward 414 and back 416, left 418 and right 420, roll 422, yaw 424, and pitch 426. A combination of these movements ultimately indicates to the controller 108 what water flow is desired by the user.

Different water flows include turning the water flow on or off, changing the flow rate of the water, adjusting the temperature, changing the water dispensed from filtered or unfiltered, metering a present amount, and setting a preset fill amount. For example, a gesture up 410 may turn the water flow on and a gesture down 412 may turn the water flow off. For example, a gesture forward 414 may increase the speed of the water flow and a gesture back 416 may decrease the speed of the water flow. A gesture up may increase water temperature, and a gesture down may decrease water temperature. Although not described, many other gestures and corresponding actions are possible.

In some examples, predetermined gestures may be defined to result in particular operations performed by the faucet 100. In an example, the user may set a preset fill amount that corresponds to an often-used water bottle. Then, each time the user wants to fill that particular water bottle, the user makes a predetermined gesture, and the faucet 100 dispenses only a predetermined amount of water. Further, the user could preset the temperature of the water to be dispensed to that water bottle.

Figure 8:
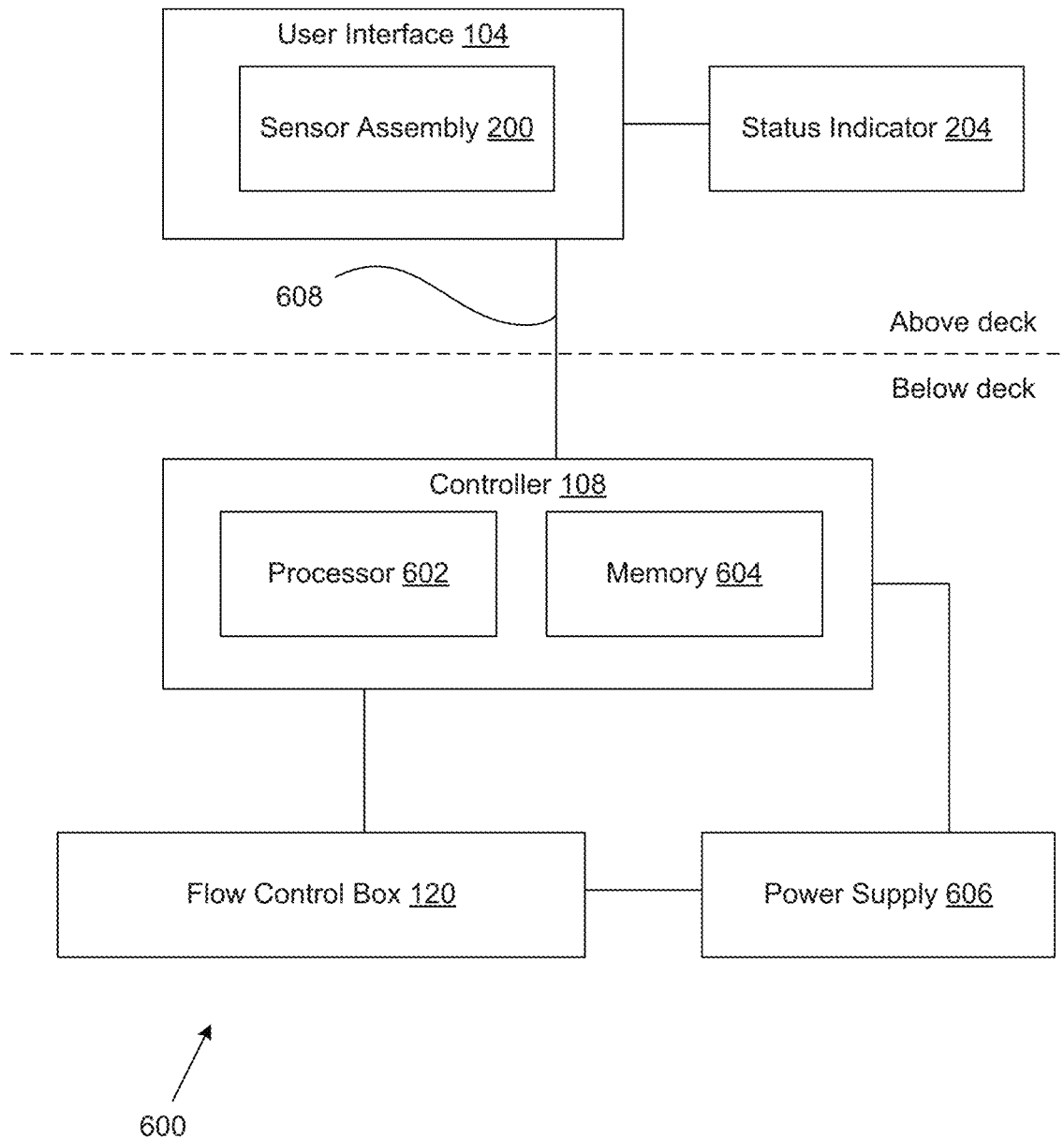
FIG. 8 illustrates a simplified block diagram of an example control system.

Referring to FIG. 8, there is shown an example electronic control system 600 for controlling dispensing of water from the faucet 100. In the example shown, the control system 600 includes the controller 108 including a processor 602 to process the signals received from the sensor assembly 200 to send a signal to the flow control box 120 and a memory 604 to store instructions to be executed by the processor 602. The controller 108 may also be connected to circuitry 608. The control system 600 also includes a power supply 606 that is connected to the controller 108 and the flow control box 120.

The flow control box 120 is configured to control the water received from water supply inlet hoses (not shown) to output water of a determined flow rate and a determined temperature based upon the gestures detected by the sensor assembly 200. The control system 600 may also include the ability to control the type of water dispensed, for example, to control the flow of filtered or unfiltered water.

In one embodiment, the user interface 104 including the sensor assembly 200 and the status indicator 204 is located above the countertop, and the controller 108, flow control box 120, and power supply 606 are located below the countertop. The components of the control system 600 may be arranged above and below the countertop as appropriate.

The power supply 606 provides power to the sensor assembly 200 through the controller 108. In another embodiment, the power supply 606 may be connected directly to the sensor assembly 200. The power supply 606 can be power supplied from an outlet and converted as necessary for use by the controller 108, flow control box 120, and sensor assembly 200. The flow control box 120 may have a separate power supply 606 than the controller 108. The power supply 606 may be any power source to supply electrical power for the function of the sensor assembly 200, controller 108, and the flow control box 120.

The sensor assembly 200 can send the gestures received from the optical sensors 202 to the controller 108 to use an algorithm in order to determine a desired water flow, for example, the temperature of the water and the flow rate of the water to be released from the spray head 106. In another embodiment, the controller 108 may use a look-up table to determine the desired water flow, for example, the temperature of the water and the flow rate of the water to be released from the spray head 106.

In another embodiment, the faucet circuitry 608 may include networking components (e.g., Bluetooth, WiFi, mesh networking, Zigbee, etc.) such that the faucet 100 is communicatively coupled with the controller 108. In some embodiments, the faucet 100 may use one or more communication links that allows the faucet 100 to be located a distance from the control system 600.

In some embodiments, the faucet includes smart faucet features, such as those seen in U.S. Patent Publication No. 2021/0343281, entitled "Electronic Faucet with Smart Features", the disclosure of which is hereby incorporated by reference in its entirety. Other example smart faucet features are seen in U.S. Patent Publication No. 2021/0335358, entitled "Electronic Faucet with Smart Features", the disclosure of which is hereby incorporated by reference in its entirety. In some embodiments, the smart faucet includes features for voice commands, such as those seen in International Application No. PCT/US2021/053059, entitled "Smart Electronic Faucet System", the disclosure of which is hereby incorporated by reference in its entirety.

In some embodiments, the faucet includes features for voice control. In some embodiments, the voice commands are associated with control actions. Example of control actions include adjusting the flow, temperature, rate, volume, and duration of water being dispensed by the faucet. Similar control actions can be associated with different gestures. For example, a user moving their hand in one direction can be associated with a control action for dispensing cold water and the opposite direction can be associated with a control action for dispensing hot water. In some embodiments, a gesture in a third direction is associated with a control action for dispensing warm water. Similarly gestures can be associated with stopping and starting the water flow. In some embodiments, a user can customize the gestures based on desired operation. In some embodiments, the sensor(s) for detecting gestures are placed on the neck of faucet. In other embodiments, the sensor(s) for detecting gestures can be placed elsewhere, e.g., under the neck of the faucet, at a sprayhead, or on a faucet base/body portion. In some embodiments, the sensor(s) for detecting gestures are placed near the end of the neck adjacent to the outlet and facing an upward direction.

In some embodiments, the voice controls are processed in the cloud and/or on a computing device local to the faucet. Similarly, the gesture control features described herein, can be processed in the cloud or on a computing device local to the faucet. In some embodiments, more complex voice commands and/or gestures are processed at the cloud, while basic commands are executed on a device local to the faucet. In some embodiments, the computing device local to the faucet is a device enabled with a virtual assistant such as an Amazon Alexa®, a Google Assistant™, or Apple SIRI® enabled device. In some embodiments, a user can ask a virtual assistant to dispense a set amount of water and/or dispense water at a specific temperature. The virtual assistant can be used to process other commands or other combinations of commands, including any combination of commands for adjusting the flow, temperature, rate, volume, and duration of water being dispensed by the faucet. In some embodiments, a user may include different automations for the smart faucet. For example, a user may include a water dispensing profile for washing dishes, washing produce, washing hands, providing drinking water, etc. These profiles can each include a predetermined temperature, volume, flowrate, etc. In some embodiments, the water profiles are customized by a user.

In some embodiments, the faucet includes a sensor to detect the presence of a utensil below the sink. In some embodiments, this sensor is a motion sensor. In some embodiments, the gesture sensors are used. In some embodiments, when a faucet receives a volume command, the faucet will wait until motion is detected below the head of the faucet, where the motion indicates that a utensil (e.g., a bowl or pot) is underneath the sink and the water will automatically dispense the correct volume. In other embodiments, a user can gesture to start dispensing a desired volume and/or a user can provide a voice command.

In some embodiments, the faucet includes a temperature sensor. In these embodiments, the controller may adjust the valves of the cold and hot water valves while the faucet dispenses water until the water temperature, as detected by the temperature sensor, matches a temperature set by a user. Once the temperature matches the requested temperature, the faucet may provide an indication to the user that the water is ready. Examples of indications that the water has reached a desired temperature include: stopping the faucet from dispensing water, flashing a light, an audio indication from a connected device with a speaker, a notification sent to a mobile computing device, etc. In some embodiments, a user may request a specific volume of water at a desired temperature. In some of these embodiments, the faucet dispenses water and adjusts the hot and cold water valves until the water reaches a desired temperature. After the water reaches the desired temperature, the faucet stops dispensing water until motion is detected indicating that the user has placed a utensil underneath the spray head of the faucet and once the utensil is detected at a location underneath the faucet, the faucet dispenses water at the set volume and temperature. In other embodiments, the faucet stops dispensing water once the water reaches the desired temperature and in response to a detected gesture, the faucet dispenses water at the desired temperature and volume.

In some embodiments, the faucet may not include a handle, such as the faucet illustrated and described in reference to FIG. 1. Another example is illustrated in U.S. Pat. No. D816,806 entitled "FAUCET", the disclosure of which is hereby incorporated by reference in its entirety. A further example is illustrated in U.S. Pat. No. D808,501 entitled "FAUCET", the disclosure of which is hereby incorporated by reference in its entirety. In these examples, the faucet can be controlled using gestures and/or voice as described herein. In some embodiments, the faucet can also be controlled via a connected device (e.g., a mobile device or a smart home hub).

The various embodiments described above are provided by way of illustration only and should not be construed to limit the claims attached hereto. Those skilled in the art will readily recognize various modifications and changes that may be made without following the example embodiments and applications illustrated and described herein, and without departing from the true spirit and scope of the following claims.

The description and illustration of one or more embodiments provided in this application are not intended to limit or restrict the scope of the invention as claimed in any way. The embodiments, examples, and details provided in this application are considered sufficient to convey possession and enable others to make and use the best mode of claimed invention. The claimed invention should not be construed as being limited to any embodiment, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate embodiments falling within the spirit of the broader aspects of the claimed invention and the general inventive concept embodied in this application that do not depart from the broader scope.

What is claimed is:

1. A faucet comprising:
   a faucet body comprising a spout;
   an electronic flow control assembly including a water inlet and a water outlet in fluid communication with the spout, the electronic flow control assembly configured to control a water flow being dispensed through the spout;
   a sensor assembly comprising at least one optical sensor configured to detect a gesture within a three-dimensional space proximate to the sensor assembly, wherein the sensor assembly is integrated with an end of the faucet body adjacent to a sink deck; and
   a controller electronically coupled to the sensor assembly and the electronic flow control assembly, the controller configured to receive the gesture from the sensor assembly and adjust the water flow based on the gesture received.

2. The faucet of claim 1, wherein the sensor assembly comprises four optical sensors configured to detect gestures in the three-dimensional space.

3. The faucet of claim 1, further comprising a status indicator, wherein the status indicator includes at least one LED light.

4. The faucet of claim 1, wherein the controller includes at least one predetermined control action that corresponds with a predetermined hand gesture received by the at least one optical sensor to control the water flow through the spout.

5. The faucet of claim 1, wherein adjusting the water flow comprises adjusting a water flow rate, adjusting a water temperature, dispensing filtered water, dispensing unfiltered water, dispensing a predetermined amount of water, or a combination thereof.

6. The faucet of claim 1, wherein the faucet further includes a handle that manually controls the water flow through the spout based on user-actuated movement of the handle.

7. The faucet of claim 1, wherein the sensor assembly is configured to control the electronic flow control assembly based on a location of the gesture, a speed of the gesture, a motion of the gesture, or a combination thereof.

8. The faucet of claim 1, wherein the controller is configured to dynamically adjust the water flow through the spout as changes in gestures are detected by the sensor assembly.

9. The faucet of claim 1, wherein the detected gesture is based on a spatial orientation of a hand within the three-dimensional space proximate to the sensor assembly.

10. The faucet of claim 1, wherein the controller is further configured to:
    receive a voice command; and
    determine whether to process the voice command locally or transmit the voice command to a remote device for processing.

11. A method of controlling a water flow dispensed from a faucet, the method comprising:
    detecting, via a sensor assembly comprising at least one optical sensor, a gesture within a three-dimensional space proximate to the sensor assembly, wherein the sensor assembly is integrated with an end of a faucet body of the faucet adjacent to a sink deck;
    sending the gesture to a controller, the controller electronically coupled to the sensor assembly and an electronic flow control assembly, wherein the controller is configured to send a signal to the electronic flow control assembly; and
    adjusting a water flow through the faucet, the water flow controlled by the electronic flow control assembly, without manual adjustment of a handle of the faucet.

12. The method of claim 11, wherein adjusting the water flow is determined by the controller, and wherein the controller compares the gesture detected to a database of recognized gestures to determine the water flow to be dispensed through a spout.

13. The method of claim 11, wherein the sensor assembly comprises four optical sensors configured to detect gestures in the three-dimensional space.

14. The method of claim 11, wherein the sensor assembly is configured to detect the gesture selected from a location of the gesture, a speed of the gesture, a motion of the gesture, or a combination thereof.

15. The method of claim 14, wherein the gesture corresponds to adjusting a water flow rate, adjusting a water temperature, dispensing filtered water, dispensing unfiltered water, dispensing a predetermined amount of water, or a combination thereof.

16. The method of claim 11, wherein the controller is configured to dynamically adjust the water flow through a spout as changes in gestures are detected by the sensor assembly.

17. An electronic flow control device comprising:
    an electronic flow control assembly comprising a fluid inlet and a fluid outlet, and configured to control a water flow being dispensed through a faucet spout;
    a sensor assembly comprising at least one optical sensor configured to detect a gesture within a three-dimensional space proximate to the sensor assembly, wherein the sensor assembly is integrated with an end of a faucet body adjacent to a sink deck; and
    a controller electronically coupled to the sensor assembly and the electronic flow control assembly, the controller configured to receive the gesture from the sensor assembly to adjust the water flow based on the gesture received.

18. The electronic flow control device of claim 17, wherein the sensor assembly comprises four optical sensors configured to detect gestures in the three-dimensional space.

19. The electronic flow control device of claim 17, wherein the controller is configured to control the electronic flow control assembly such that the gesture detected by the sensor assembly dynamically adjusts the water flow through the fluid outlet.

20. The electronic flow control device of claim 17, wherein the sensor assembly is configured to control the electronic flow control assembly based on a location of the gesture, a speed of the gesture, a motion of the gesture, or a combination thereof.

* * * * *